3,340,296
PREPARATION OF ACRYLIC ACID

Edwin Marvin Smolin, Springdale, Conn., assignor to American Cyanamid Company, Stamford, Conn., a corporation of Maine
No Drawing. Continuation of application Ser. No. 163,037, Dec. 29, 1961. This application June 6, 1966, Ser. No. 555,619
3 Claims. (Cl. 260—533)

This is a continuation of application Ser. No. 163,037, filed Dec. 29, 1961, and now abandoned.

This invention relates to a novel method for preparing acrylic acid. More particularly, the invention relates to an improvement in nickel salt-copper salt-catalyzed liquid-phase reactions at elevated temperatures and pressures of equivalent amounts of acetylene, carbon monoxide and water. Still more specifically, it is concerned with an improvement in carrying out such a reaction whereby the time required for its completion is substantially reduced.

It is known that equivalent quantities of acetylene, carbon monoxide and water may be reacted in the liquid phase to give acrylic acid providing elevated temperatures, elevated pressures and a nickel salt-copper salt catalyst combination are used. However, this process is not entirely satisfactory and leaves much to be desired. For example, in high pressure liquid-phase reactions as previously practiced, the time for initiating the reaction is unduly long. In the continuous synthesis of acrylic acid, there is usually a considerable lapse of time, for example, from five to fifteen hours, before the reaction proceeds at a satisfactory rate, all materials being fed continuously and proportionally. This long induction period requires long residence times for the completion of the high pressure liquid-phase reaction process and not infrequently polymerization and other reactions of acrylic acid occur with attendant loss of yield.

Since acrylic acid finds extensive use in the manufacture of synthetic resins for application in surface coatings, adhesives, etc., as well as in the formation of acrylic acid esters capable of similar end uses, an improved procedure for its manufacture has long been desired.

While numerous modifications in the general process for the nickel salt-copper salt-catalyzed liquid-phase reaction at elevated temperatures and pressures of acetylene, carbon monoxide and water have been made, nevertheless, the problem of shortening or lessening the induction period and, of course, the overall reaction time has not to the present been solved.

According to the present invention, however, the difficulties heretofore encountered have been substantially eliminated while effecting reaction within a relatively short period of time.

Pursuant to the instant discovery, it has been found that the induction period and the overall reaction time may be substantially reduced in a surprisingly straightforward manner. This is accomplished by first introducing into a reaction vessel which is charged with reaction liquid, i.e., water, solvent and a nickel salt-copper salt catalyst combination, a small quantity of acetylene or acetylene-containing gas. A reaction, which is not completely understood, would appear to take place among the water, catalyst and acetylene. This is usually evidenced by a lowering of pressure within the reaction vessel of from about 50 to about 150 pounds per square inch gauge from the original total elevated pressure within the vessel produced by the introduction of acetylene. The desired reaction, i.e., production of acrylic acid, is commenced by thereafter adding to the vessel approximately equivalent quantities of acetylene and carbon monoxide. Pretreatment of the reaction liquid may thus be accomplished with a substantially purified acetylene feed or with an acetylene stream which is diluted with such gases as those which are inert under the conditions of reaction including, for example, nitrogen, methane, ethane and the like.

While the use of excess acetylene during the entire course of the reaction has been previously known to reduce the overall reaction time, in contrast thereto it has been discovered that pretreatment of the reaction liquid with a small quantity of acetylene is surprisingly advantageous in reducing the induction period. By this procedure, the hazards involved in maintaining an excess of acetylene within the reaction vessel during the entire course of the reaction may be avoided. Yet, at the same time, the overall reaction time is substantially reduced and the necessity for supplying excess acetylene to the system which must subsequently be recovered and recycled is avoided.

It is an advantage of the present invention that the pretreatment of the reaction liquid; that is, water, solvent and nickel salt-copper salt catalyst combination, with acetylene or acetylene-containing gas, permits the reaction to take place at a given rate more smoothly and easily following the induction period which is reduced from a period of hours to minutes because of such procedure.

In general, the reaction may be conducted in the presence of a wide variety of nickel salt-copper salt catalyst combinations. Thus, for example, a nickel halide such as nickel chloride, nickel bromide or nickel iodine in combination with a copper halide such as copper chloride, copper bromide or copper iodide is satisfactory. Particularly advantageous, however, is the use of a combination of catalysts comprising a nickel or copper hydrocarbon sulfonate together with a nickel or copper halide. The use of such combination of catalysts of this type is described and claimed in copending application, Ser. No. 776,403, filed Nov. 26, 1958, now United States Patent No. 3,025,-322. Illustrative metal hydrocarbon sulfonate catalysts suitable for use in the process of the present invention are nickel methane sulfonate, copper methane sulfonate, nickel ethane sulfonate, copper ethane sulfonate, nickel hexane sulfonate, copper hexane sulfonate, nickel benzene sulfonate, copper benzene sulfonate, nickel isopropylbenzene sulfonate, copper isopropylbenzene sulfonate, nickel para-toluene sulfonate, copper para-toluene sulfonate, nickel decylbenzene sulfonate, copper decylbenzene sulfonate, nickel 2-naphthalene sulfonate, copper 2-naphthalene sulfonate, nickel dodecylbenzene sulfonate, copper dodecylbenzene sulfonate, nickel bis(2,2-ditolylbutane)sulfonate, copper bis(2,2-ditolylbutane)sulfonate, nickel bis(2,2-diphenylbutane)sulfonate, copper bis(2,2-diphenylbutane)sulfonate, nickel bis(1,1-dixylylethane)sulfonate, copper bis(1,1-dixylylethane)sulfonate, and the like and mixtures thereof.

In conjunction with such metal hydrocarbon sulfonate catalysts, nickel or copper halides such as nickel chloride, copper chloride, nickel bromide, copper bromide, nickel iodide, copper iodide and mixtures thereof may be used.

Best results are usually achieved when the hydrocarbon sulfonate and the halide have different metal cations. For instance, when nickel para-toluene sulfonate is the metal sulfonate, a copper halide, such as copper bromide, is used. Similarly, when copper para-toluene sulfonate is the metal sulfonate, a nickel halide, such as nickel bromide, is used.

Very desirable results are obtained when a nickel-containing catalyst is present in a molar excess with respect to the copper catalyst, usually in the mole ratio range of 2:1 to 4:1. However, the range of 1:1 to 6:1 is also suitable.

Generally, the catalysts are present in sufficient quantity to provide from 0.1 to 8.0 percent by weight of nickel salt, preferably 0.2 to 5.0 percent by weight, basis the total weight of the non-gaseous mixture. Likewise, a sufficient quantity of catalyst is generally present to provide from 0.02 to 5.0 percent by weight copper salt, preferably from 0.5 to 1.0 percent by weight, basis the total weight of the non-gaseous reaction mixture.

By the expression "non-gaseous" reaction mixture used herein, the non-gaseous components charged to the reactor, i.e., the solvent, water and catalyst, are intended.

In carrying out the reaction of acetylene, carbon monoxide and water in the presence of a catalyst combination as contemplated herein, it is very advantageous to use an excess by volume of an inert oxygen-containing organic solvent which is inert to the reactants under the reaction conditions and miscible with water. In other words, the solvents are not irreversibly changed by the presence of water and are not able to react with acetylene or carbon monoxide. The solvents, therefore, should not contain free hydroxy, mercapto, or carboxy groups, olefinic or acetylenic linkages, or primary or secondary amino groups. The boiling points of the solvents are preferably below that of acrylic acid.

Preferred solvents are cyclic ethers, such as tetrahydrofuran, dioxane, and saturated aliphatic ketones, such as acetone, methyl ethyl ketone and diethyl ketone.

While a slight excess of the solvent with respect to the water employed is suitable, for example, 60 parts by volume of solvent for 40 parts by volume of water, much greater excesses of the liquid organic solvent are preferred. For instance, a volume ratio of solvent to water in the range of about 75:25 to about 95:5 is desirable.

While an equimolar ratio of acetylene to carbon monoxide is generally used following the induction period, the instant invention also contemplates the use of an excess of either of these reactants up to about 100 molar percent or more. In other words, a mole ratio of acetylene to carbon monoxide of from about 2:1 to about 1:2 may be employed.

The reaction contemplated herein advantageously may be conducted at temperatures as low as 150° C. and as high as 220° C. Preferably, reaction temperatures in the range of about 160° C. to about 205° C. are employed. Pretreatment of the reaction liquid with acetylene or acetylene-containing gas may be accomplished at temperatures from about 20° C. to about 150° C. On the other hand, total pressures as low as 300 pounds per square inch gauge and as high as about 900 pounds per square inch gauge are suitable, yet total pressures in the range of about 450 pounds per square inch gauge to about 840 pounds per square inch gauge are preferred. Much higher total pressures may also be employed, for example, up to several thousand pounds per square inch gauge provided, however, that the partial pressure of acetylene in the gaseous phase does not exceed about 450 pounds per square inch gauge.

The process of the instant invention may be conducted in a batch, semi-continuous and continuous manner.

The water component utilized in the instant discovery may be present in an equivalent amount, basis the acetylene and carbon monoxide reactants. More commonly, however, these gaseous components are used in excess over the water. An excess of acetylene and/or carbon monoxide over water of 10 to 20 molar percent or more, for example, is often desirable, but not essential.

In order to facilitate an understanding of the present invention, the following illustrative examples are given:

*Example 1*

A 12% solution of water in acetone containing a nickel salt-copper salt catalyst combination is charged to a pressure reaction vessel in an amount calculated to give the desired conversion of water to acrylic acid while, at the same time, an acetylene feed stream is also passed thereinto. When the reactor is fully charged with liquid and gas and brought to temperature, no further liquid feed is introduced. A trickle of acetylene gas is maintained for the purpose of agitation. Within 20 to 30 minutes, an induction period appears to terminate as evidenced by a pressure drop of from about 700 p.s.i.g. to about 600 p.s.i.g. Thereupon, an acetylene and carbon monoxide mixture is admitted into the vessel together with additional reaction liquid. Reaction solution and sufficient unreacted gases are purged so as to maintain the total pressure at about 650 to 750 p.s.i.g.

The following table contains a summary of experimental results obtained when the procedure outlined above was followed and demonstrates the effect on percent conversion to acrylic acid which is produced when the reaction liquid medium is pretreated with acetylene prior to the reaction of water, acetylene and carbon monoxide.

TABLE I.—EFFECT ON CONVERSION OF PRETREATMENT WITH ACETYLENE

| Sample | Temperature, ° C. | Catalyst | Pretreatment | Conversion to Acrylic Acid (percent) |
|---|---|---|---|---|
| A | 185 | 0.2% $NiBr_2 \cdot 3H_2O$, 0.05% $CuBr_2$, 0.15% hydroquinone inhibitor. | No | 3.5 |
| B | 185 | ...do... | No | 8.5 |
| C | 185 | ...do... | No | 4.6 |
| D | 185 | ...do... | Yes | 18.4 |
| E | 185 | ...do... | Yes | 17.1 |
| F | 185 | ...do... | Yes | 15.5 |
| G | 185 | ...do... | Yes | 16.4 |
| H | 185 | ...do... | Yes | 25.5 |
| I | 185 | ...do... | Yes | 24.6 |
| J | 185 | ...do... | Yes | 21.3 |
| K | 195 | 0.2-0.5% nickel bromide or nickel decylbenzene sulfonate and 0.05-0.2% copper decylbenzene sulfonate or copper bromide. | No | 0.3 |
| L | 195 | ...do... | No | 0.2 |
| M | 195 | ...do... | No | 1.2 |
| N | 195 | ...do... | No | 2.5 |
| O | 195 | ...do... | Yes | 22.0 |
| P | 195 | ...do... | Yes | 22.2 |
| Q | 195 | ...do... | Yes | 23.4 |
| R | 195 | ...do... | Yes | 22.6 |
| S | 195 | ...do... | Yes | 20.3 |
| T | 195 | ...do... | Yes | 20.4 |

*Example 2*

In order to further substantiate the results appearing in Table I and to demonstrate the utility of the process of the present invention for batch as well as for continuous reactions, a number of runs were carried out in batch autoclaves.

In this procedure, a suitable pressure vessel is charged with 12% water in acetone plus 0.2% $NiBr_2 \cdot 3H_2O$, 0.5% $CuBr_2$ and 0.1% hydroquinone. In Runs BA and BB only, a small amount of acetylene is then introduced into the vessel whose contents are maintained at 20° to 25° C. Thereafter, the vessel is heated to the desired reaction temperature and an equimolar mixture of carbon monoxide and acetylene is then admitted into the vessel. Pressure drop taking place within the vessel is then observed. Subsequently, the vessel is cooled to ambient temperature (20° to 25° C.) and the solution produced is removed therefrom.

The results of these runs are summarized in the following table where the induction time represents the number of minutes for a 100–pound-per-square-inch gauge pressure drop to occur.

From these results, it will be readily observed that pretreatment of the reaction medium is notably effective in reducing the period for induction. As a consequence, the overall time for the synthesis of acrylic acid is markedly lessened.

TABLE II.—BATCH INDUCTION TESTS

| Run | Temperature, ° C. | Acetylene Gas Pretreatment | Induction Time Minutes |
| --- | --- | --- | --- |
| BA | 185 | Yes | 7.5 |
| BB | 195 | Yes | 0 |
| BC | 185 | No | 152 |
| BD | 195 | No | 79 |
| BE | *185 | No | 93 |
| BF | *195 | No | 38 |
| BG | 195 | No | 72 |

* Twice the amount of catalyst employed.

While the present invention has been described in detail as to specific embodiments thereof, it is not intended that these details constitute undue limitations upon the scope of the invention, excepting, of course, insofar as these limitations appear in the appended claims.

I claim:

1. In a process for producing acrylic acid by reacting in a reaction medium approximately equivalent quantities of acetylene and carbon monoxide at a sufficiently elevated temperature and pressure to form acrylic acid, the improvement comprising a preliminary step of first adding acetylene to said reaction medium, said adding being in an amount sufficient (1) for a reaction to take place and (2) to thereby reduce induction period and over-all reaction time, said reaction medium comprising (a) a nickel halide-copper halide catalyst combination, (b) water, and (c) an organic, water-miscible inert solvent.

2. A process according to claim 1 having said acetylene and said carbon monoxide in a relative mole ratio of from about 2:1 to about 1:2, including reacting said first added acetylene at from about 20° C. up to about 150° C., said elevated temperature ranging from 160° C. up to about 205° C., said elevated pressure ranging from about 450 pounds up to about 840 pounds including an acetylene partial pressure ranging up to 450 pounds, said solvent and said water being in a relative volume ratio ranging from about 75:25 to about 95:5 of solvent:water, said catalyst being present in an amount ranging from 0.2% to 5% by weight of said nickel halide, from 0.02 to 5% by weight of said copper halide, and from 0.5 to 1% by weight of non-gaseous reaction mixture.

3. A process according to claim 2, in which said organic, water-miscible inert solvent is selected from the group consisting of tetrahydrofuran, dioxane, acetone, methyl ethyl ketone, and diethyl ketone.

References Cited

UNITED STATES PATENTS 3,025,322   3/1962   Smolin et al. _____ 260—533

LORRAINE A. WEINBERGER, *Primary Examiner.*

L. ARNOLD THAXTON, *Assistant Examiner.*